United States Patent
Yoneyama (10) Patent No.: US 6,532,342 B2
(45) Date of Patent: Mar. 11, 2003

(54) PHOTOGRAPHING LENS SYSTEM

(75) Inventor: Shuji Yoneyama, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/986,585

(22) Filed: Nov. 9, 2001

(65) Prior Publication Data

US 2002/0097994 A1 Jul. 25, 2002

(30) Foreign Application Priority Data

Nov. 10, 2000 (JP) ........................................ 2000-342857

(51) Int. Cl.$^7$ ............................ G03B 17/00; G02B 13/02
(52) U.S. Cl. ............................................. 396/79; 359/748
(58) Field of Search ............................ 396/79; 348/684, 348/690, 748, 785–788

(56) References Cited

U.S. PATENT DOCUMENTS

| | | | |
|---|---|---|---|
| 4,437,734 A | 3/1984 | Iizuka | 359/745 |
| 4,573,770 A | 3/1986 | Mizuno | 359/745 |
| 4,732,459 A * | 3/1988 | Hayashi | 359/745 |
| 5,751,486 A | 5/1998 | Misawa et al. | 359/557 |
| 6,317,275 B1 * | 11/2001 | Yoneyama | 359/748 |
| 6,384,975 B1 * | 5/2002 | Hayakawa | 359/786 X |

FOREIGN PATENT DOCUMENTS

| | | | |
|---|---|---|---|
| JP | 4-255813 | 9/1992 | G02B/13/02 |
| JP | 5-157964 | 6/1993 | G02B/13/02 |

* cited by examiner

*Primary Examiner*—W. B. Perkey
(74) *Attorney, Agent, or Firm*—Greenblum & Bernstein, P.L.C.

(57) ABSTRACT

A photographing lens system including a first lens group, a second lens group, and a third lens group. The negative second lens group is moved to the image, upon focusing. The positive first lens group includes a biconvex lens element, another biconvex lens element, and a biconcave lens element. The second lens group includes cemented lens elements constituted by a meniscus lens element having the concave surface facing toward the object and a biconcave lens element. The photographing lens system satisfies the following conditions: $0.020 < dX/f < 0.20$ ... (1); $(n1+n2)/2 > 1.52$ ... (2); $(v1+v2)/2 > 55$ ... (3); wherein dX: the traveling distance of the second lens group; f: the focal length of the entire photographing lens system when an object at infinity is in an in-focus state; n1: the refractive index of the d-line of the first lens group; n2: the refractive index of the d-line of the second lens group; v1: the Abbe number of the first lens group; and v2: the Abbe number of the second lens group.

7 Claims, 8 Drawing Sheets

PHOTOGRAPHING LENS SYSTEM

BACKGROUND OF THE INVENTION

1. Field of the Invention

The present invention relates to an inner-focusing-type photographing lens system which (i) is suitable for a photographing camera or a video camera, (ii) performs focusing by moving an inner portion of the lens system, i.e., lens groups other than the most object-side lens group, (iii) has a bright F-number of about 2.5, and (iv) the full angle-of-view $2\omega$ is about 21 degrees.

2. Description of the Related Art

In a fast intermediate-telephoto lens system which has (i) an F-number of less than 2.8, and (ii) the full angle-of-view of about 18 to 28 degrees, the entire length of the lens system becomes longer since the focal length thereof is relatively long. Moreover, due to the bright F-number of the above intermediate-telephoto lens system, the lens diameters thereof become larger, so that the lens system tends to be larger and heavier. Consequently, for example, in an auto-focus (AF) camera, since a heavy load is exerted on the lens-driving system for moving lens groups in the lens system, the speed of focusing becomes slower. Because of these reasons, an inner-focusing-type photographing lens system, in which only an inner portion of the lens system is moved in order to perform focusing has been proposed, as disclosed in, e.g., Japanese Unexamined Patent Publication (JUPP) No. Hei-4-255813, and JUPP No. Hei-5-157964.

In the above inner-focusing-type photographing lens system, in order to reduce the burden of the correcting of aberrations in a focusing lens group, and to reduce the fluctuation of aberrations therein upon focusing, it is preferable to reduce aberrations in a lens group in front of the focusing lens group. Accordingly, the lens group in front of the focusing lens group is commonly constituted by three positive lens elements and one negative lens element. On the other hand, in such a fast intermediate telephoto lens system, the diameter of the frontmost lens group tends to be larger due to a relatively wider angle-of-view and a smaller F-number. Still further, there are cases where a filter is attached to the front of the photographing lens system. In those cases, if the diameter of the frontmost lens group is larger, the weight and cost of accessories, such as a filter and the like, have to be increased as well. Moreover, an increase in the diameter of the frontmost lens group causes an increase in the weight of the entire lens system. Consequently, portability of a photographing lens (barrel), to which the above inner-focusing-type photographing lens system is provided, becomes worse. Therefore the frontmost lens group with a smaller diameter is required.

SUMMARY OF THE INVENTION

An object of the present invention is to provide a photographing lens system which (i) has a relatively bright F-number of about 2.5, (ii) the full angle-of-view $2\omega$ is about 21 degrees, and (iii) can reduce the diameter of the frontmost lens group. Another object of the present invention is to provide an inner-focusing-type photographing lens system which can reduce the number of lens elements of a lens group in front of the focusing lens group.

In order to achieve the above-mentioned objects, there is provided a photographing lens system including a positive first lens group, a negative second lens group, and a positive third lens group, in this order from the object. The photographing lens system is arranged to move the negative second lens group to the image, upon focusing from infinity to an object at a shorter distance. The positive first lens group includes a biconvex positive lens element, a biconvex positive lens element, and a biconcave negative lens element, in this order from the object. The second lens group includes cemented lens elements constituted by a positive meniscus lens element having the concave surface facing toward the object and a negative biconcave lens element, in this order from the object. Furthermore, the photographing lens system satisfies the following conditions:

$$0.020 < dX/f < 0.200 \quad (1)$$

$$(n1+n2)/2 > 1.52 \quad (2)$$

$$(v1+v2)/2 > 55 \quad (3)$$

wherein dX designates the traveling distance of the second lens group, the distance of which corresponds to an object in an in-focus state at infinity to an object in an in-focus state at the shortest photographing distance;

f designates the focal length of the entire photographing lens system when an object at infinity is in an in-focus state;

n1 designates the refractive index of the d-line of the most object-side positive lens element in the first lens group;

n2 designates the refractive index of the d-line of the most object-side positive lens element in the second lens group;

v1 designates the Abbe number of the most object-side positive lens element in the first lens group; and v2 designates the Abbe number of the most object-side positive lens element in the second lens group.

The photographing lens system preferably satisfies the following condition:

$$0.58 < f1/f < 0.72 \quad (4)$$

wherein f1 designates the focal length of the first lens group; and f designates the focal length of the entire photographing lens system when an object at infinity is in an in-focus state.

Furthermore, the photographing lens system preferably satisfies the following condition:

$$0.12 < f/f_{1-2} < 0.29 \quad (5)$$

wherein f designates the focal length of the entire photographing lens system when an object at infinity is in an in-focus state; and $f_{1-2}$ designates the combined focal length of the first lens group and the second lens group when an object at infinity is in an in-focus state.

According to another aspect of the present invention, there is provided a photographing lens system including a positive first lens group, a negative second lens group, and a positive third lens group, in this order from the object. The photographing lens system is arranged to move the negative second lens group to the image, upon focusing from infinity to an object at a shorter distance. The positive first lens group includes a biconvex positive lens element, a biconvex positive lens element, and a biconcave negative lens element, in this order from the object. The second lens group includes cemented lens elements constituted by a positive meniscus lens element having the concave surface facing toward the object and a negative biconcave lens element, in this order from the object. The third lens group includes cemented lens elements constituted by a negative lens element having a concave surface facing toward the object and a positive lens element, and a positive lens element, in this order from the object.

Furthermore, the photographing lens system satisfies the following conditions:

$$0.020 < dX/f < 0.200 \quad (1)$$

$$(n1+n2)/2 > 1.52 \quad (2)$$

$$(v1+v2)/2 > 55 \quad (3)$$

wherein dX designates the traveling distance of the second lens group, the distance of which corresponds to an object in an in-focus state at infinity to an object in an in-focus state at the shortest photographing distance;

f designates the focal length of the entire photographing lens system when an object at infinity is in an in-focus state;

n1 designates the refractive index of the d-line of the most object-side positive lens element in the first lens group;

n2 designates the refractive index of the d-line of the most object-side positive lens element in the second lens group;

v1 designates the Abbe number of the most object-side positive lens element in the first lens group; and v2 designates the Abbe number of the most object-side positive lens element in the second lens group.

The photographing lens system preferably satisfies the following condition:

$$0.58 < f1/f < 0.72 \quad (4)$$

wherein f1 designates the focal length of the first lens group; and f designates the focal length of the entire photographing lens system when an object at infinity is in an in-focus state.

Furthermore, the photographing lens system preferably satisfies the following condition:

$$0.12 < f/f_{1-2} < 0.29 \quad (5)$$

wherein f designates the focal length of the entire photographing lens system when an object at infinity is in an in-focus state; and $f_{1-2}$ designates the combined focal length of the first lens group and the second lens group when an object at infinity is in an in-focus state.

The present disclosure relates to subject matter contained in Japanese Patent Application No. 2000-342857 (filed on Nov. 10, 2000) which is expressly incorporated herein in its entirety.

BRIEF DESCRIPTION OF THE DRAWINGS

The invention will be discussed below in detail with reference to the accompanying drawings, in which.

DESCRIPTION OF THE PREFERRED EMBODIMENTS

The photographing lens system of the present invention, as shown in FIGS. 1, 5, 9 and 13, includes a positive first lens group 10, a negative second lens group 20, a diaphragm S, and a positive third lens group 30, in this order from the object. The positive first lens group 10 includes a biconvex positive lens element 11, a biconvex positive lens element 12, and a biconcave negative lens element 13, in this order from the object. The positive second lens group 20 is a focusing lens group which is moved to the image when focusing from infinity to an object at a shorter distance is performed. The positive second lens group 20 includes cemented lens elements constituted by a positive meniscus lens element 21 having the concave surface facing toward the object, and a biconcave negative lens element 22. The positive third lens group 30 includes cemented lens elements constituted by a negative lens element 31 having a concave surface facing toward the object and a positive lens element 32, and a positive lens element 33, in this order from the object. The diaphragm S is provided in front of the third lens group 30; however, instead of being before the third lens group 30, the diaphragm S can be provided in front of the second lens group 20.

In the first lens group 10, according to the three-lens-element arrangement, i.e., a positive lens element (the biconvex positive lens element 11), a positive lens element (the biconvex positive lens element 12), and a negative lens element (the biconcave negative lens element 13), in this order from the object, the diameter of the frontmost lens group can be reduced. In order to correct aberrations by a smaller number of lens elements, it is preferable that aberrations occurred in the first lens element and the second lens element are reduced to a minimum by distributing the occurrences thereof over the two lens elements. For this purpose, both the first and second lens elements are constituted by biconvex lens elements, so that the occurrences of spherical aberration and come are reduced. Furthermore, the third lens element includes a biconcave lens element so that aberrations occurred in the first and second lens elements can be further corrected.

As explained, the negative second lens group 20 includes the cemented lens elements so that the second lens group 20 as a whole is formed into a biconcave shape. Unless an achromatic arrangement is taken by cementing lens elements, chromatic aberration occurs in the entire lens system when the second lens group 20, i.e., the focusing lens group, is moved. Accordingly, cementing lens elements is a minimum optical requirement for the second lens group 20 as a focusing lens group.

The positive third lens group 30 is constituted by three lens elements. Due to this arrangement, aberrations can be maintained suitably, even if a bright F-number is provided.

Condition (1) specifies the traveling distance of the focusing lens group in the inner-focusing-type photographing lens system, i.e., the second lens group 20.

If the traveling distance of the second lens group 20 becomes longer to the extent that dX/f exceeds the upper limit of condition (1), the overall length of the lens system has to be increased in order to secure a space within the lens system to allow the second lens group 20 to move. Furthermore, if the traveling distance of the second lens group 20 is made longer, the diameter of the first lens group 10 has to be increased to secure peripheral illumination, which will be against miniaturization of the lens system.

If the traveling distance of the second lens group 20 becomes shorter to the extent that dX/f exceeds the lower limit of condition (1), the focusing sensitivity has to be increased so that an in-focus state can be obtained with a shorter traveling distance. As a result, optical power (hereinafter, power) of each lens group generally becomes stronger. This causes an increase in aberration occurred in each lens group, so that aberrations fluctuate at shorter distances.

Condition (2) specifies the average of refractive indices of the positive lens elements in the positive first lens group 10. This condition is for reducing the occurrences of aberrations under the condition that the first lens group 10 includes only two positive lens elements. In other words, the number of the positive lens elements in the first lens group 10 is relatively smaller.

If (n1+n2)/2 exceeds the lower limit of condition (2), the radius of curvature of each lens surface becomes smaller, and accordingly the angle of incidence becomes larger. As a result, aberrations excessively occur, so that aberrations over the entire lens system cannot suitably be balanced.

Condition (3) specifies the average of the Abbe numbers of the positive lens elements in the first lens group 10.

If (ν1+ν2)/2 exceeds the lower limit of condition (3), chromatic aberration largely occurs.

Condition (4) specifies the focal length of the first lens group 10.

If the power of the first lens group 10 becomes stronger to the extent that f1/f exceeds the lower limit of condition (4), aberrations largely occur in the first lens group 10. Accordingly, aberrations occurred in the entire lens system cannot be maintained smaller, and the first lens group 10 cannot be constituted by a smaller number of lens element, e.g., the three lens elements.

If the focal length of the first lens group 10 becomes longer to the extent that f1/f exceeds the upper limit of condition (4), aberrations in the first lens group 10 can be reduced; however, chromatic aberration becomes larger, so that chromatic aberration over the entire lens system becomes larger.

Condition (5) specifies the ratio of the focal length of the entire photographing lens system to the focal length from the positive first lens group 10 to that of the negative second lens group 20, i.e., the magnification of the positive third lens group 30.

If the magnification of the positive third lens group 30 becomes smaller to the extent that $f/f_{1-2}$ exceeds the lower limit of condition (5), the overall length of the lens system has to be increased. In other words, if the magnification of the positive third lens group 30 is smaller, the focal lengths of the positive first lens group 10 and the negative second lens group 20, both of which are constituted by a relatively smaller number of lens elements, become longer. As a result, since only smaller power is required for these lens groups, the occurrences of aberrations can advantageously be reduced; however, it is not preferable that the overall length of the lens system increases.

If $f/f_{1-2}$ exceeds the upper limit of condition (5), the power of the positive first lens group 10 and that of the negative second lens group 20 becomes stronger, so that aberrations largely occur. Moreover, aberrations largely occur in the positive third lens group 30 as well which is constituted by a relatively large number of lens elements, such as the three lens elements. Consequently, aberrations largely occur over the entire lens system.

Specific numerical data of the embodiments will be described hereinafter. In figures showing aberrations, SA designates spherical aberration, and SC designates the sine condition; with respect to chromatic aberration (axial chromatic aberration) represented by spherical aberration, the solid line and the two types of dotted lines respectively indicate spherical aberrations with respect to the d, g and C lines; with respect to lateral chromatic aberration, the two types of dotted lines respectively indicate magnification with respect to the g and C lines; however, the d line as the base line coincides with the ordinate; S designates the sagittal image, M designates the meridional image; and Y designates the image height. In the tables, Fno designates the F-number, m designates the photographing magnification, f designates the focal length of the entire lens system, W designates the half angle-of-view (°), $f_B$ designates the back focal distance, r designates the radius of curvature, d designates the lens-element thickness or distance between lens elements, $N_d$ designates the refractive index of the d-line, and ν designates the Abbe number. Note that in all the embodiments, the shortest photographing distance is set at 1 meter (=8.55 f).

Embodiment 1

Figure 1:
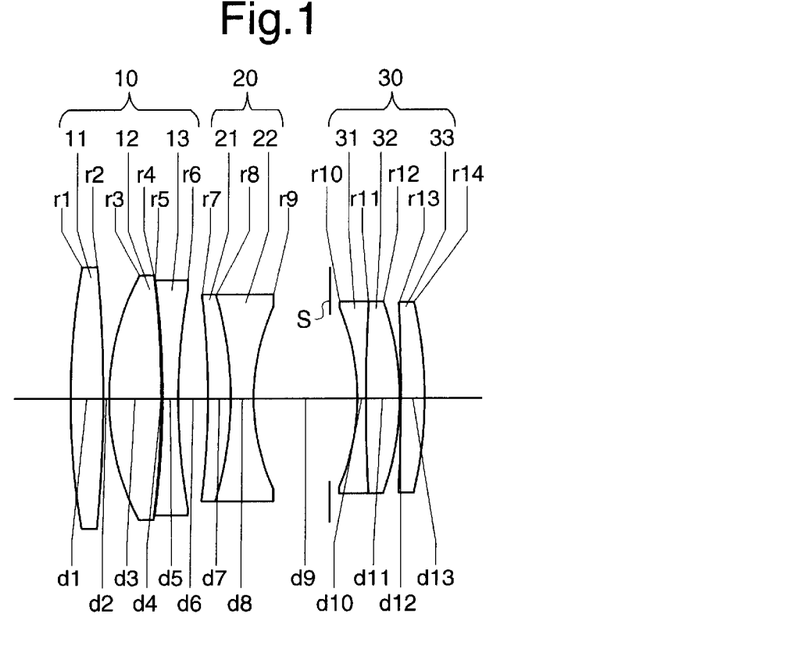
FIG. 1 shows a lens arrangement of a photographing lens system according to a first embodiment of the present invention, when an object at infinity is in an in-focus state.
Figure 2A:
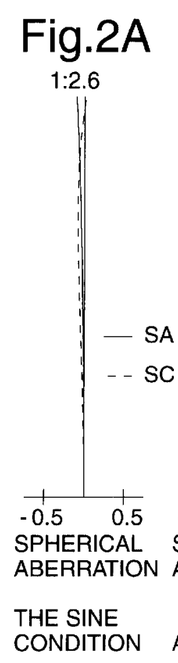
FIGS. 2A, 2B, 2C, 2D and 2E show aberrations occurred in the lens arrangement shown in FIG. 1, when an object at infinity is in an in-focus state.
Figure 2B:
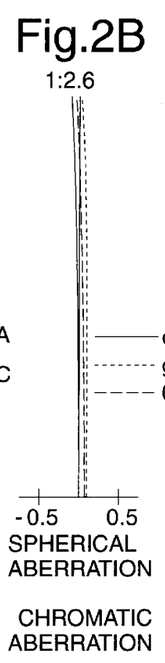
Figure 2C:
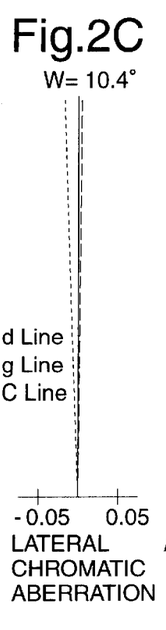
Figure 2D:
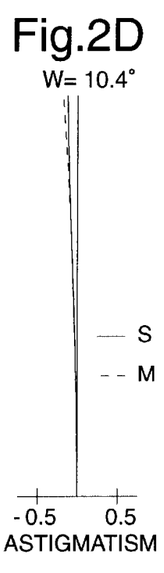
Figure 2E:
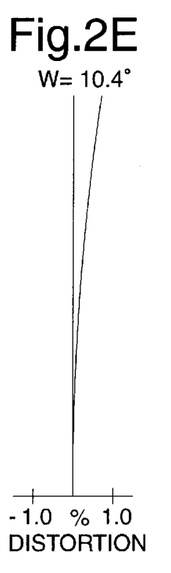
Figure 3A:
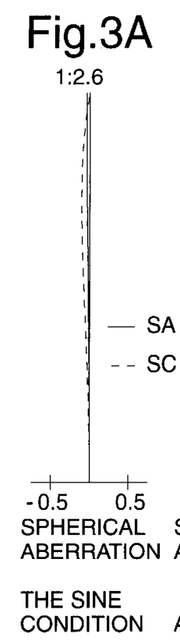
FIGS. 3A, 3B, 3C, 3D and 3E show aberrations occurred in the lens arrangement shown in FIG. 1, at a photographing magnification of −1/50.
Figures 3B, 3C, 3D:
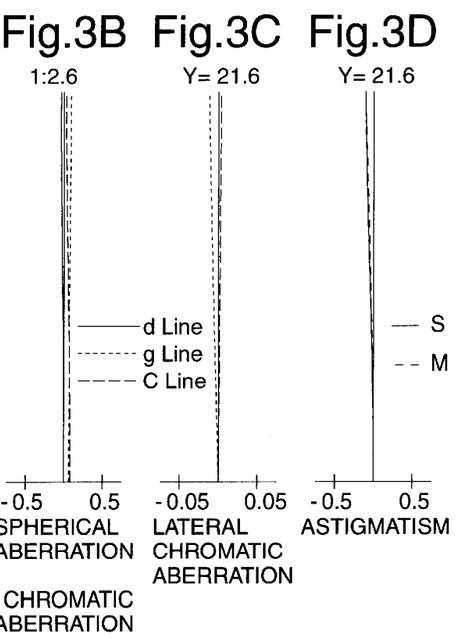
Figure 3E:
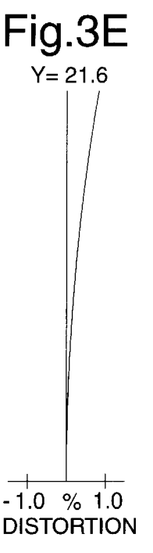
Figure 4A:
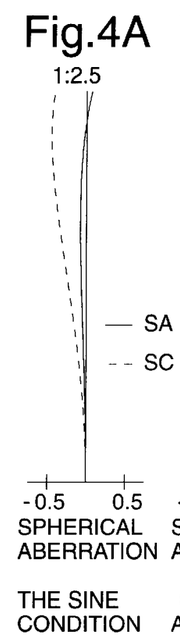
FIGS. 4A, 4B, 4C, 4D and 4E show aberrations occurred in the lens arrangement shown in FIG. 1, when an object at the shortest photographing distance is in an in-focus state.
Figures 4B, 4C, 4D:
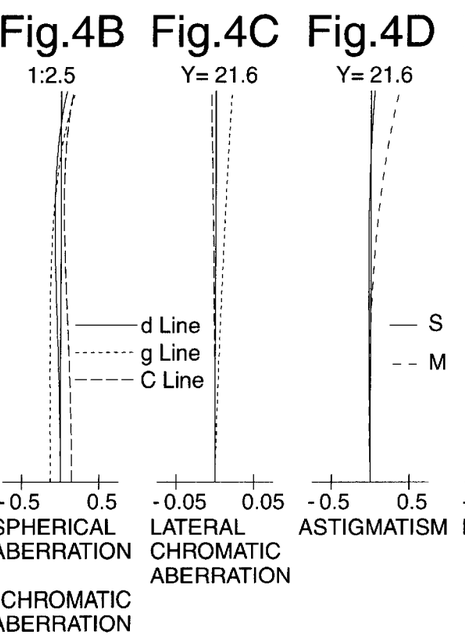
Figure 4E:
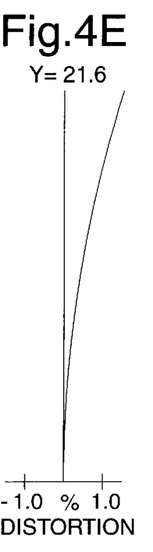

FIG. 1 shows the lens arrangement of the photographing lens system according to the first embodiment, when an object at an infinite photographing distance is in an in-focus state. FIGS. 2A through 2E show aberrations occurred in the lens arrangement shown in FIG. 1, when an object at an infinite photographing distance is in an in-focus state. FIGS. 3A through 3E show aberrations occurred in the lens arrangement shown in FIG. 1, at a photographing magnification of −1/50. FIGS. 4A through 4E show aberrations occurred in the lens arrangement shown in FIG. 1, when an object at the shortest photographing distance is in an in-focus state. Table 1 shows the numerical data of the first embodiment.

TABLE 1

$F_{NO} = 1:2.6$
$f = 117.00$
$m = 0.000—0.020—0.148$
$f_B = 83.53$
$dX = 7.70$

| Surf. No. | r | d | Nd | ν |
|---|---|---|---|---|
| 1 | 132.332 | 5.75 | 1.72916 | 54.7 |
| 2 | −240.546 | 1.01 | — | — |
| 3 | 45.700 | 9.20 | 1.49700 | 81.6 |
| 4 | −177.826 | 0.23 | — | — |
| 5 | −159.988 | 2.76 | 1.64769 | 33.8 |
| 6 | 108.068 | 5.29–6.31–12.99 | — | — |
| 7 | −144.270 | 4.00 | 1.84666 | 23.8 |
| 8 | −62.674 | 4.00 | 1.54814 | 45.8 |
| 9 | 38.175 | 18.30–17.28–10.60 | — | — |
| 10 | −39.721 | 1.50 | 1.67270 | 32.1 |
| 11 | 303.045 | 5.91 | 1.80400 | 46.6 |
| 12 | −50.157 | 0.20 | — | — |
| 13 | −366.502 | 4.24 | 1.80400 | 46.6 |
| 14 | −72.903 | — | — | — |

Embodiment 2

Figure 5:
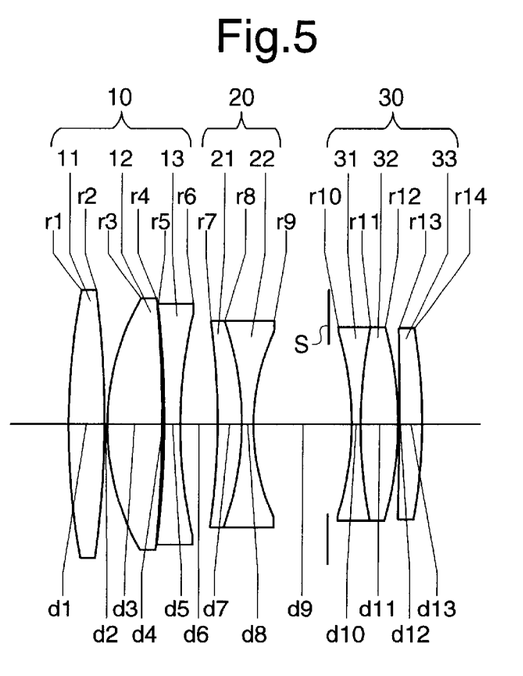
FIG. 5 shows a lens arrangement of the photographing lens system according to a second embodiment of the present invention, when an object at infinity is in an in-focus state.
Figure 6A:
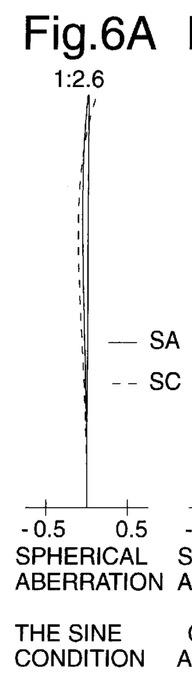
FIGS. 6A, 6B, 6C, 6D and 6E show aberrations occurred in the lens arrangement shown in FIG. 5, when an object at infinity is in an in-focus state.
Figures 6B, 6C:
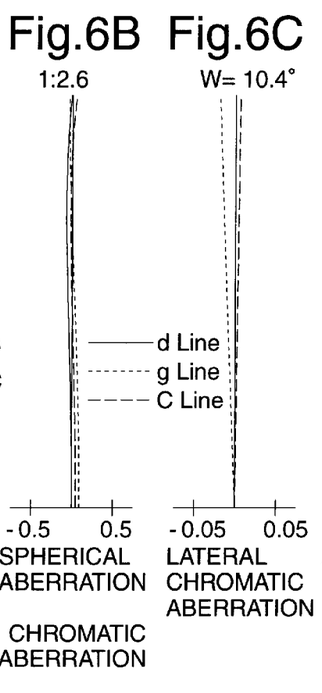
Figure 6D:
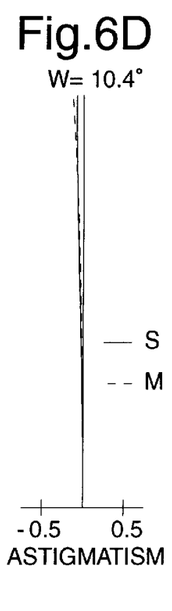
Figure 6E:
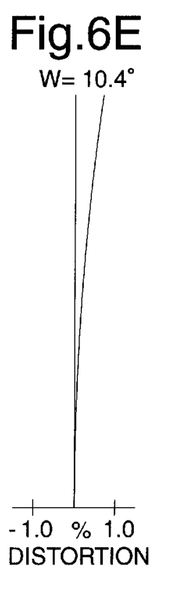
Figure 7A:
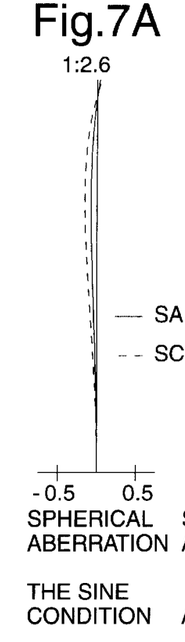
FIGS. 7A, 7B, 7C, 7D and 7E show aberrations occurred in the lens arrangement shown in FIG. 5, at a photographing magnification of −1/50.
Figures 7B, 7C:
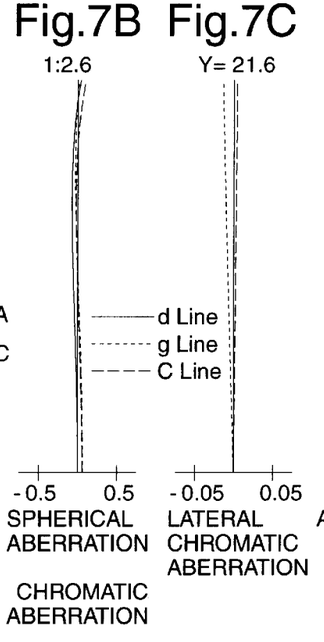
Figure 7D:
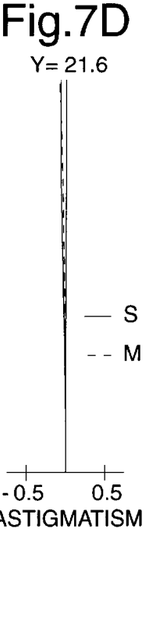
Figure 7E:
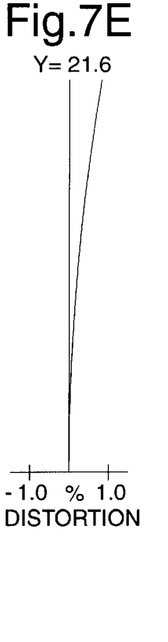
Figure 8A:
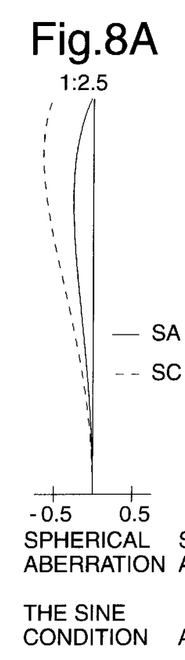
FIGS. 8A, 8B, 8C, 8D and 8E show aberrations occurred in the lens arrangement shown in FIG. 5, when an object at the shortest photographing distance is in an in-focus state.
Figures 8B, 8C:
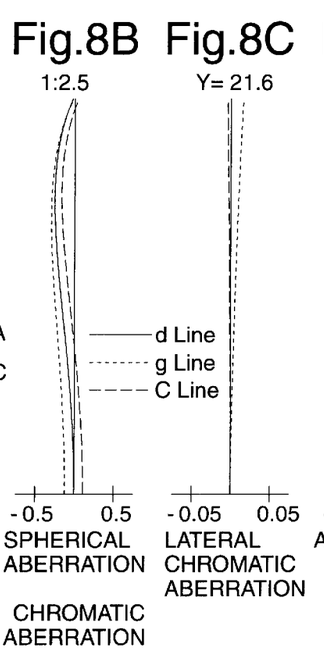
Figure 8D:
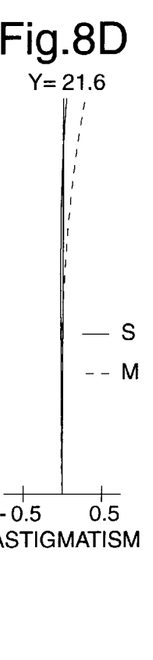
Figure 8E:
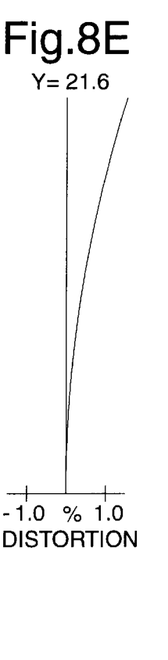

FIG. 5 shows the lens arrangement of the photographing lens system according to the second embodiment, when an object at an infinite photographing distance is in an in-focus state. FIGS. 6A through 6E show aberrations occurred in the lens arrangement shown in FIG. 5, when an object at an infinite photographing distance is in an in-focus state. FIGS. 7A through 7E show aberrations occurred in the lens arrangement shown in FIG. 5, at a photographing magnification of −1/50. FIGS. 8A through 8E show aberrations occurred in the lens arrangement shown in FIG. 5, when an object at the shortest photographing distance is in an in-focus state. Table 2 shows the numerical data of the second embodiment.

TABLE 2

$F_{NO} = 1:2.6$
$f = 117.00$
$m = 0.000—0.020—0.147$
$f_B = 81.65$
$dX = 7.04$

| Surf. No. | r | d | Nd | ν |
|---|---|---|---|---|
| 1 | 124.411 | 6.20 | 1.56907 | 71.3 |
| 2 | −171.269 | 0.49 | — | — |
| 3 | 43.807 | 9.40 | 1.56907 | 71.3 |
| 4 | −226.101 | 0.39 | — | — |
| 5 | −171.986 | 2.76 | 1.62588 | 35.7 |
| 6 | 83.847 | 6.41–7.35–13.45 | — | — |
| 7 | −121.220 | 4.20 | 1.84666 | 23.8 |
| 8 | −51.459 | 2.00 | 1.58267 | 46.6 |
| 9 | 37.967 | 16.78–15.83–9.73 | — | — |
| 10 | −54.512 | 1.50 | 1.67270 | 32.1 |
| 11 | 86.868 | 6.44 | 1.80400 | 46.6 |
| 12 | −60.267 | 0.20 | — | — |
| 13 | −798.973 | 3.91 | 1.80400 | 46.6 |
| 14 | −96.484 | — | — | — |

Embodiment 3

Figure 9:
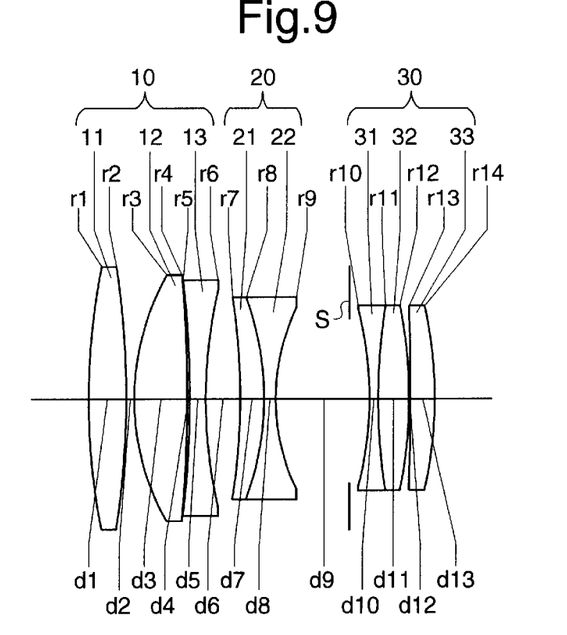
FIG. 9 shows a lens arrangement of the photographing lens system according to a third embodiment of the present invention, when an object at infinity is in an in-focus state.
Figure 10A:
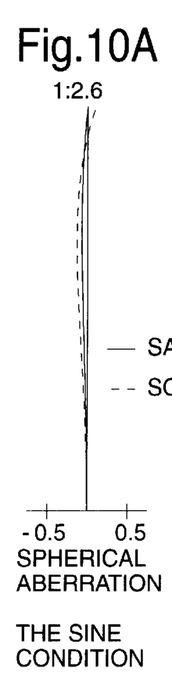
FIGS. 10A, 10B, 10C, 10D and 10E show aberrations occurred in the lens arrangement shown in FIG. 9, when an object at infinity is in an in-focus state.
Figure 10B:
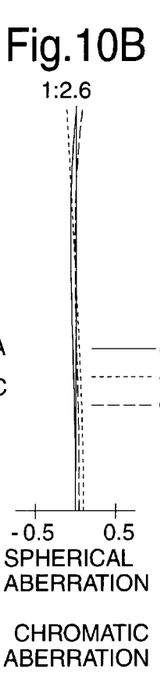
Figure 10C:
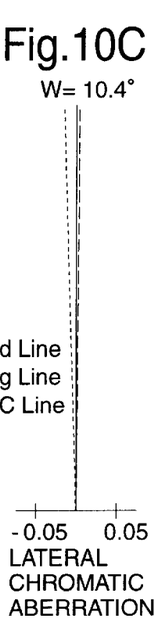
Figure 10D:
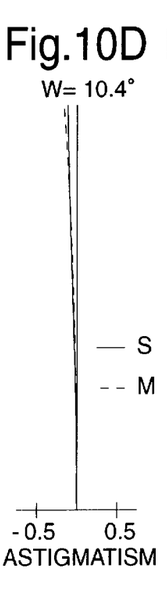
Figure 10E:
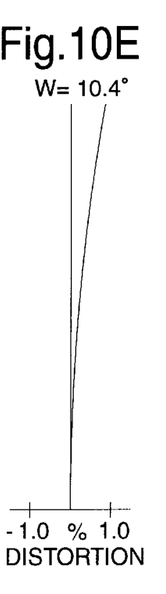
Figure 11A:
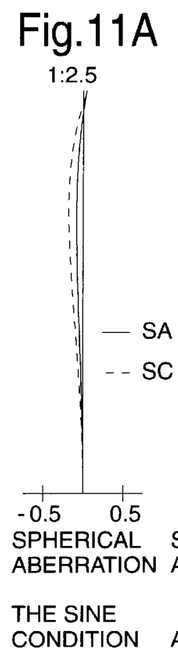
FIGS. 11A, 11B, 11C, 11D and 11E show aberrations occurred in the lens arrangement shown in FIG. 9, at a photographing magnification of −1/50.
Figure 11B:
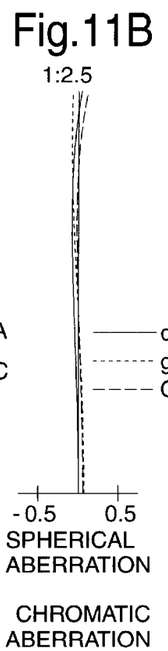
Figure 11C:
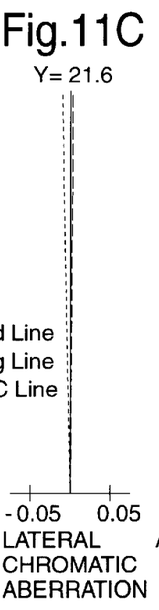
Figure 11D:
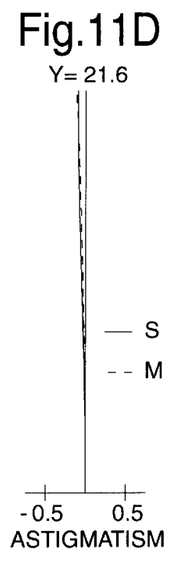
Figure 11E:
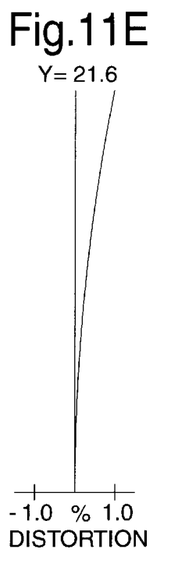
Figure 12A:
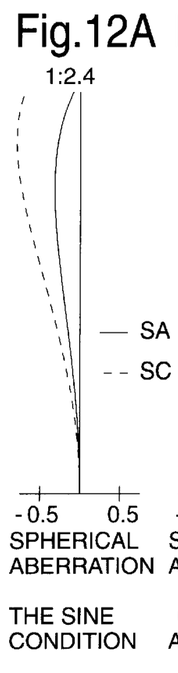
FIGS. 12A, 12B, 12C, 12D and 12E show aberrations occurred in the lens arrangement shown in FIG. 9, when an object at the shortest photographing distance is in an in-focus state.
Figure 12B:
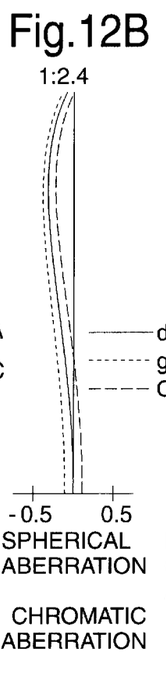
Figure 12C:
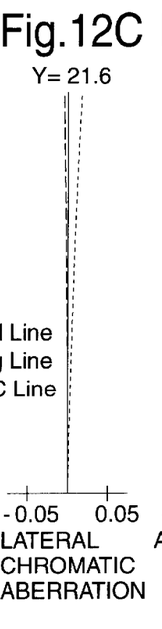
Figure 12D:
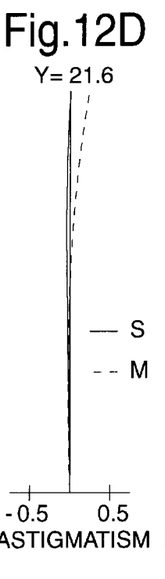
Figure 12E:
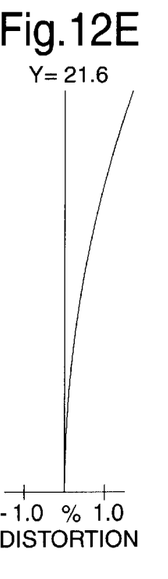

FIG. 9 shows the lens arrangement of the photographing lens system according to the third embodiment, when an object at an infinite photographing distance is in an in-focus state. FIGS. 10A through 10E show aberrations occurred in the lens arrangement shown in FIG. 9, when an object at an infinite photographing distance is in an in-focus state. FIGS. 11A through 11E show aberrations occurred in the lens arrangement shown in FIG. 9, at a photographing magnification of −1/50. FIGS. 12A through 12E show aberrations occurred in the lens arrangement shown in FIG. 9, when an object at the shortest photographing distance is in an in-focus state. Table 3 shows the numerical data of the third embodiment.

TABLE 3

$F_{NO} = 1:2.6$
$f = 117.00$
$m = 0.000—0.020—0.146$
$f_B = 80.48$
$dX = 6.76$

| Surf. No. | r | d | Nd | ν |
|---|---|---|---|---|
| 1 | 115.627 | 6.60 | 1.49700 | 81.6 |
| 2 | −149.374 | 1.38 | — | — |
| 3 | 43.167 | 9.30 | 1.59240 | 68.3 |
| 4 | −245.837 | 0.47 | — | — |
| 5 | −171.834 | 2.76 | 1.62588 | 35.7 |
| 6 | 83.284 | 6.04–6.95–12.80 | — | — |
| 7 | −111.922 | 4.20 | 1.84666 | 23.8 |
| 8 | −49.734 | 2.00 | 1.56013 | 47.0 |
| 9 | 36.364 | 16.30–15.39–9.53 | — | — |
| 10 | −60.922 | 1.50 | 1.68893 | 31.1 |
| 11 | 103.861 | 5.46 | 1.80400 | 46.6 |
| 12 | −79.647 | 0.20 | — | — |
| 13 | −549.868 | 4.28 | 1.80300 | 46.7 |
| 14 | −71.583 | — | — | — |

Embodiment 4

Figure 13:
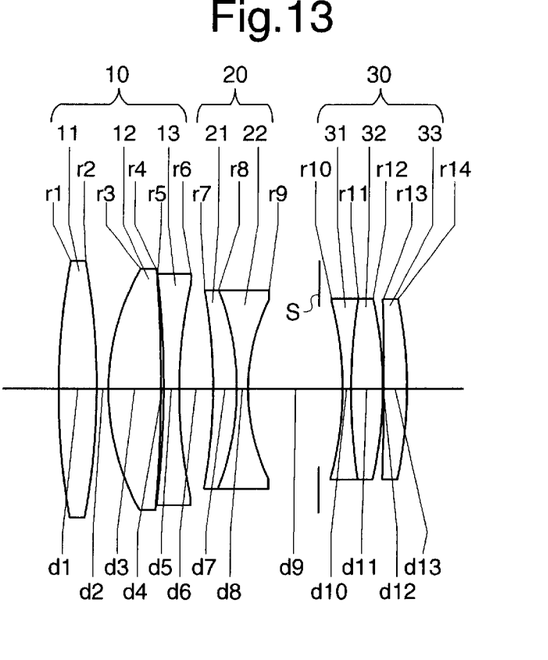
FIG. 13 shows a lens arrangement of the photographing lens system according to a fourth embodiment of the present invention when an object at infinity is in an in-focus state.
Figure 14A:
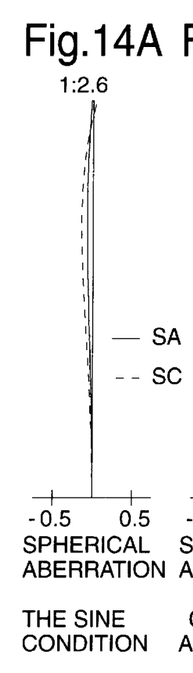
FIGS. 14A, 14B, 14C, 14D and 14E show aberrations occurred in the lens arrangement shown in FIG. 13, when an object at infinity is in an in-focus state.
Figures 14B, 14C:
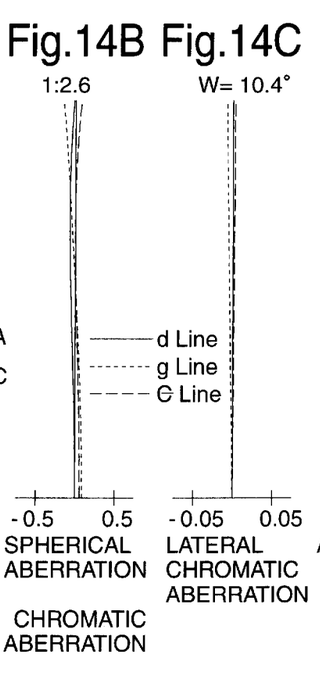
Figure 14D:
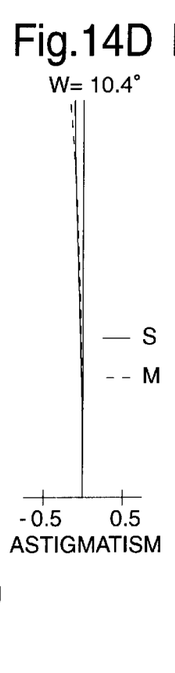
Figure 14E:
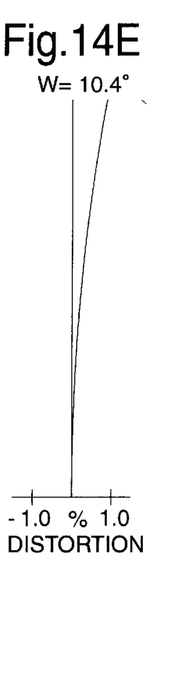
Figure 15A:
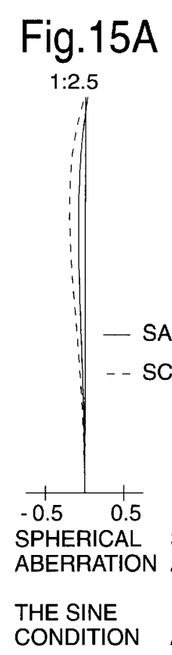
FIGS. 15A, 15B, 15C, 15D and 15E show aberrations occurred in the lens arrangement shown in FIG. 13, at a photographing magnification of −1/50.
Figures 15B, 15C:
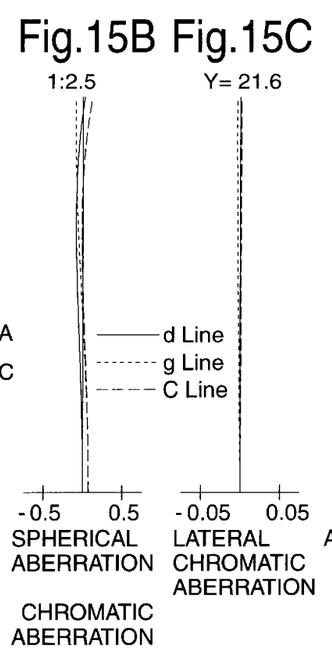
Figure 15D:
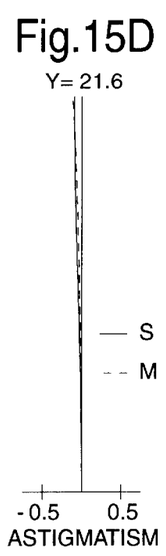
Figure 15E:
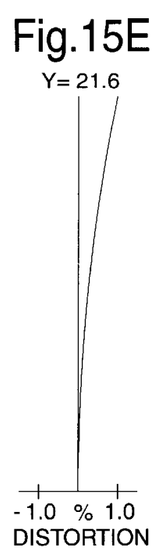
Figures 16A, 16B, 16C:
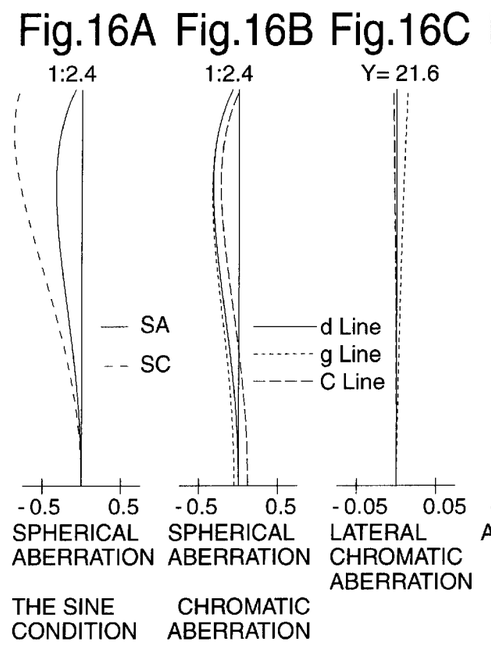
FIGS. 16A, 16B, 16C, 16D and 16E show aberrations occurred in the lens arrangement shown in FIG. 13, when an object at the shortest photographing distance is in an in-focus state.
Figure 16D:
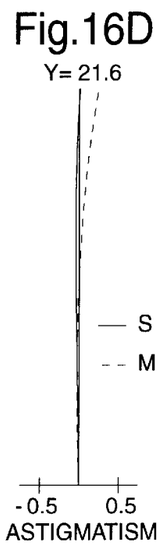
Figure 16E:
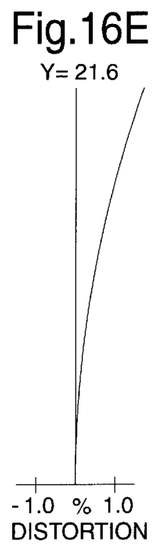

FIG. 13 shows the lens arrangement of the photographing lens system according to the fourth embodiment, when an object at an infinite photographing distance is in an in-focus state. FIGS. 14A through 14E show aberrations occurred in the lens arrangement shown in FIG. 13, when an object at an infinite photographing distance is in an in-focus state. FIGS.

15A through 15E show aberrations occurred in the lens arrangement shown in FIG. 13, at a photographing magnification of −1/50. FIGS. 16A through 16E show aberrations occurred in the lens arrangement shown in FIG. 13, when an object at the shortest photographing distance is in an in-focus state. Table 4 shows the numerical data of the fourth embodiment.

TABLE 4

$F_{NO}$ = 1:2.6
f = 117.00
m = 0.000—0.020—0.146
$f_B$ = 80.47
dX = 7.20

| Surf. No. | r | d | Nd | ν |
|---|---|---|---|---|
| 1 | 126.294 | 6.80 | 1.43875 | 95.0 |
| 2 | −126.294 | 2.11 | — | — |
| 3 | 43.641 | 9.30 | 1.61800 | 63.4 |
| 4 | −259.602 | 0.52 | — | — |
| 5 | −171.674 | 2.76 | 1.64831 | 33.8 |
| 6 | 87.189 | 6.06–7.03–13.26 | — | — |
| 7 | −99.555 | 4.20 | 1.84666 | 23.8 |
| 8 | −49.411 | 2.00 | 1.51742 | 52.4 |
| 9 | 36.085 | 16.84–15.87–9.64 | — | — |
| 10 | −59.794 | 1.50 | 1.69895 | 30.1 |
| 11 | 103.384 | 5.63 | 1.80400 | 46.6 |
| 12 | −73.112 | 0.20 | — | — |
| 13 | −482.842 | 4.14 | 1.80400 | 46.6 |
| 14 | −75.925 | — | — | — |

Each condition of each embodiment is shown in the following Table 5.

TABLE 5

| | Cond. (1) | Cond. (2) | Cond. (3) | Cond. (4) | Cond. (5) |
|---|---|---|---|---|---|
| Embod.1 | 0.0660 | 1.61308 | 68.2 | 0.653 | 0.246 |
| Embod.2 | 0.0602 | 1.56907 | 71.3 | 0.631 | 0.174 |
| Embod.3 | 0.0578 | 1.54470 | 75.0 | 0.618 | 0.217 |
| Embod.4 | 0.0615 | 1.52838 | 79.2 | 0.634 | 0.246 |

As can be understood from Table 5, each embodiment satisfies each condition. Furthermore, as can be understood from the aberration diagrams, the aberrations are relatively well corrected.

According to the above description, a photographing lens system, which (i) has a relatively bright F-number of about 2.5, (ii) the full angle-of-view $2_\omega$ is about 21 degrees, and (iii) can reduce the diameter of the frontmost lens group, can be obtained. Furthermore, an inner-focusing-type photographing lens system, which can reduce the number of lens elements of a lens group in front of the focusing lens group, can be obtained.

What is claimed is:

1. A photographing lens system comprising a positive first lens group, a negative second lens group, and a positive third lens group, in this order from an object, wherein said photographing lens system is arranged to move said negative second lens group to an image, upon focusing from infinity to an object at a shorter distance;

wherein said positive first lens group comprises a biconvex positive lens element, a biconvex positive lens element, and a biconcave negative lens element, in this order from said object;

wherein said second lens group comprises cemented lens elements comprising a positive meniscus lens element having the concave surface facing toward said object and a negative biconcave lens element, in this order from said object; and wherein said photographing lens system satisfies the following conditions:

0.020<dX/f<0.200

(n1+n2)/2>1.52

(ν1+ν2)/2>55 wherein dX designates the traveling distance of said second lens group, the distance of which corresponds to an object in an in-focus state at infinity to an object in an in-focus state at the shortest photographing distance;

f designates the focal length of the entire photographing lens system when an object at infinity is in an in-focus state;

n1 designates the refractive index of the d-line of the most object-side positive lens element in said first lens group;

n2 designates the refractive index of the d-line of the second positive lens element from the object side in said first lens group;

ν1 designates the Abbe number of the most object-side positive lens element in said first lens group; and ν2 designates the Abbe number of the second positive lens element from the object side in said first lens group.

2. The photographing lens system according to claim 1, satisfying the following condition:

0.58<f1/f<0.72 wherein f1 designates the focal length of said first lens group; and f designates the focal length of the entire photographing lens system when an object at infinity is in an in-focus state.

3. The photographing lens system according to claim 1, satisfying the following condition:

0.12<f/f$_{1-2}$<0.29 wherein f designates the focal length of the entire photographing lens system when an object at infinity is in an in-focus state; and f$_{1-2}$ designates the combined focal length of said first lens group and said second lens group when an object at infinity is in an in-focus state.

4. A photographing lens system comprising a positive first lens group, a negative second lens group, and a positive third lens group, in this order from an object, wherein said photographing lens system is arranged to move said negative second lens group to an image, upon focusing from infinity to an object at a shorter distance;

wherein said positive first lens group comprises a biconvex positive lens element, a biconvex positive lens element, and a biconcave negative lens element, in this order from said object;

wherein said second lens group comprises cemented lens elements comprising a positive meniscus lens element having the concave surface facing toward said object and a negative biconcave lens element, in this order from said object; and wherein said third lens group comprises cemented lens elements comprising a negative lens element having a concave surface facing toward said object and a positive lens element, and a positive lens element, in this order from said object.

5. The photographing lens system according to claim 4, satisfying the following conditions:

$$0.020 < dX/f < 0.200$$

$$(n1+n2)/2 > 1.52$$

$$(v1+v2)/2 > 55$$

wherein dX designates the traveling distance of said second lens group, the distance of which corresponds to an object in an in-focus state at infinity to an object in an in-focus state at the shortest photographing distance;

f designates the focal length of the entire photographing lens system when an object at infinity is in an in-focus state;

n1 designates the refractive index of the d-line of the most object-side positive lens element in said first lens group;

n2 designates the refractive index of the d-line of the second positive lens element from the object side in said first lens group;

v1 designates the Abbe number of the most object-side positive lens element in said first lens group; and v2 designates the Abbe number of the second positive lens element from said object side in said first lens group.

6. The photographing lens system according to claim 4, satisfying the following condition:

$$0.58 < f1/f < 0.72$$

wherein f1 designates the focal length of said first lens group; and f designates the focal length of the entire photographing lens system when an object at infinity is in an in-focus state.

7. The photographing lens system according to claim 4, satisfying the following condition:

$$0.12 < f/f_{1-2} < 0.29$$

wherein f designates the focal length of the entire photographing lens system when an object at infinity is in an in-focus state; and $f_{1-2}$ designates the combined focal length of said first lens group and said second lens group when an object at infinity is in an in-focus state.

* * * * *